(12) United States Patent
Mattmann et al.

(10) Patent No.: US 8,969,493 B2
(45) Date of Patent: Mar. 3, 2015

(54) PROCESS AND APPARATUS FOR CONTINUOUSLY POLYMERIZING CATIONICALLY POLYMERIZABLE MONOMERS

(75) Inventors: Wolfgang Mattmann, Limburgerhof (DE); Wolfgang Loth, Bad Duerkheim (DE); Phillip Hanefeld, Heidelberg (DE); Elke Guetlich-Hauk, Lambsheim (DE); Thomas Wettling, Limburgerhof (DE); Andreas Daiss, Deidesheim (DE)

(73) Assignee: BASF SE, Ludwigshafen (DE)

( * ) Notice: Subject to any disclaimer, the term of this patent is extended or adjusted under 35 U.S.C. 154(b) by 546 days.

(21) Appl. No.: 12/935,443

(22) PCT Filed: Apr. 30, 2009

(86) PCT No.: PCT/EP2009/055298
§ 371 (c)(1),
(2), (4) Date: Sep. 29, 2010

(87) PCT Pub. No.: WO2009/133187
PCT Pub. Date: Nov. 5, 2009

(65) Prior Publication Data
US 2011/0028666 A1 Feb. 3, 2011

(30) Foreign Application Priority Data

May 2, 2008 (EP) .................................... 08155608

(51) Int. Cl.
*C08F 10/10* (2006.01)
*C08F 110/10* (2006.01)

(52) U.S. Cl.
CPC .............. *C08F 10/10* (2013.01); *C08F 110/10* (2013.01)
USPC .................................................... 526/124.3

(58) Field of Classification Search
CPC .................................. C08F 10/10; C08F 2/00
USPC .......................................................... 526/124
See application file for complete search history.

(56) References Cited

U.S. PATENT DOCUMENTS

| 4,327,201 A | 4/1982 | Kennedy et al. |
| 4,946,889 A | 8/1990 | Nishioka |
| 5,169,914 A | 12/1992 | Kaszas et al. |
| 6,555,629 B1 | 4/2003 | Pysall et al. |
| 2004/0171772 A1* | 9/2004 | Huffer et al. .................. 526/64 |
| 2009/0203874 A1 | 8/2009 | Loeffler et al. |
| 2009/0315204 A1 | 12/2009 | Loesch et al. |
| 2010/0004427 A1 | 1/2010 | Rath et al. |
| 2010/0081727 A1 | 4/2010 | Hanefeld et al. |
| 2010/0137643 A1 | 6/2010 | Tishkov et al. |
| 2010/0170636 A1 | 7/2010 | Hanefeld et al. |
| 2010/0185032 A1 | 7/2010 | Iselborn et al. |
| 2010/0293842 A1 | 11/2010 | Kasel et al. |

FOREIGN PATENT DOCUMENTS

| DE | 40 25 961 | 2/1992 |
| DE | 196 48 028 | 3/1997 |
| DE | 196 10 350 | 9/1997 |
| EP | 206 756 | 12/1986 |
| EP | 264 214 | 4/1988 |
| EP | 265 053 | 4/1988 |
| WO | 99 54362 | 10/1999 |
| WO | 02 48215 | 6/2002 |
| WO | 02 096964 | 12/2002 |
| WO | 03 074577 | 9/2003 |

OTHER PUBLICATIONS

U.S. Appl. No. 12/990,734, filed Nov. 2, 2010, Mattmann, et al.
Jesper Feldthusen, et al., "Endfunctional Polymers by Functionalization of Living Cationic Chain Ends With 1,1-Diphenylethylene Compounds", Macromolecular Reporst, vol. A32, No. 5 & 6, 1995, pp. 639-647.
Jesper Feldthusen, et al., "Stable Carbanions by Quantitative Metalation of Cationically Obtained Dyphenylvinyl and Diphenylmethoxy Compounds: New Initiators for living Anionic Polymerizations", Macromolecules, vol. 30, 1997, pp. 6989-6993.
Jesper Feldthusen, et al., "Synthesis of Linear and Star-Shaped Block Copolymers of Isobutylene and Methacrylates by Combination of Living Cationic and Anionic Polymerizations", Macromolecules, vol. 31, 1998, pp. 578-585.
Manfred Baerns, et al., "Chemische Reaktionstechnik", Lehrbuch der Technischen Chemie, vol. 1, $2^{nd}$ edition,1992, pp. 332 and 339.
Munmaya K. Mishra, et al., "New Telechelic Polymers and Sequential Copolymers by Polyfunctional Initiator-Transfer Agents (Inifers) 47. Dehydrochlorination Studies of 'CI-PIB-CI': Quantitative Dehydrochlorination to $\alpha$, $\omega$-Di (Isopropenyl)-PIB by NaOEt" Polymer Bulletin, vol. 13, 1985, pp. 435-439.
U.S. Appl. No. 13/084,805, filed Apr. 12, 2011, Ahmadnian, et al.

* cited by examiner

*Primary Examiner* — Kelechi Egwin
(74) *Attorney, Agent, or Firm* — Oblon, McClealland, Maier & Neustadt, L.L.P.

(57) ABSTRACT

The present invention relates to a process and to an apparatus for continuous living polymerization of cationically polymerizable monomers, in which at least three feedstocks are mixed in one or more mixers with microstructures and then polymerized in at least one reaction zone.

21 Claims, 1 Drawing Sheet

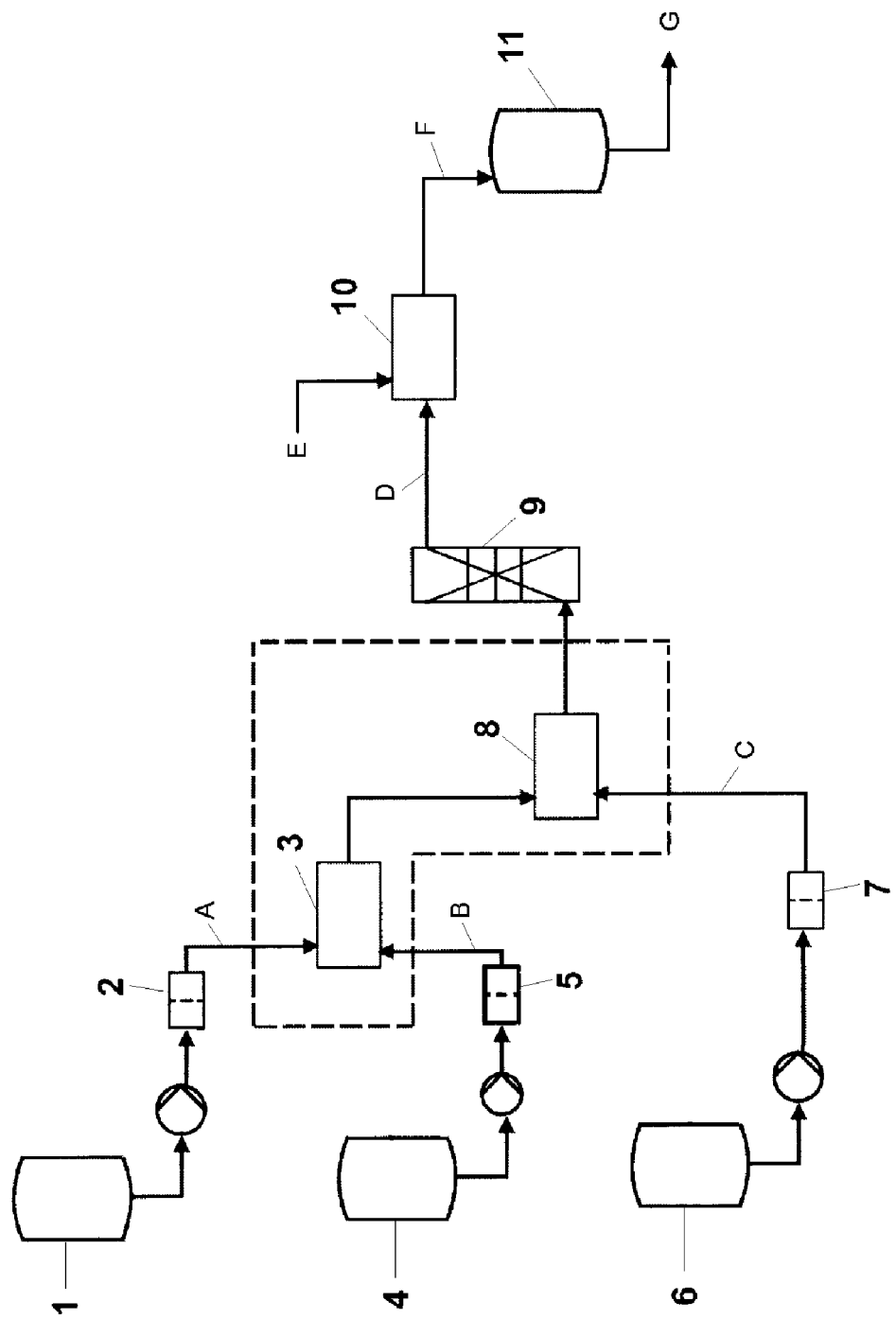

PROCESS AND APPARATUS FOR CONTINUOUSLY POLYMERIZING CATIONICALLY POLYMERIZABLE MONOMERS

CROSS-REFERENCE TO RELATED APPLICATIONS

This application is a National Stage of PCT/EP09/055298 filed Apr. 30, 2009. This application is based upon and claims the benefit of priority to European Application No. 08155608.6 filed May 2, 2008.

BACKGROUND OF THE INVENTION

The present invention relates to a process and to an apparatus for continuous living polymerization of cationically polymerizable monomers, in which at least three feedstocks are mixed in one or more mixers with microstructures and then polymerized in at least one reaction zone.

The preparation of polymers and especially of polyisobutenes by living cationic polymerization of the parent monomers is known. Living cationic polymerization refers generally to the polymerization of cationically polymerizable monomers and especially of isoolefins or vinylaromatics in the presence of metal halides or semimetal halides as Lewis acid catalysts and tert-alkyl halides, or benzyl or alyll halides, esters or ethers as initiators, which form a carbocation or cationic complex with the Lewis acid. A comprehensive review of this subject can be found in Kennedy/Ivan, "Carbocationic Macromolecular Engineering", Hauser Publishers 1992.

The advantage of living cationic polymerization is that polymers with relatively narrow molecular weight distributions are obtained. However, a narrow molecular weight distribution is obtained only when the polymerization is carried out at very low temperatures which generally must not be above −70° C. Processes which have to be carried out at such low temperatures are, however, often scarcely implementable and uneconomic on the industrial scale. Continuous processes for living cationic polymerization usable on the industrial scale are to date unknown.

WO 99/54362 describes a process for continuous free-radical solution polymerization, in which at least two reactants are conducted through a micromixer and combined, mixed with one another and then polymerized in a tubular reactor.

It was an object of the present invention to provide a more economically viable process for living cationic polymerization. More particularly, the process should be performable continuously and should allow performance at higher temperatures than the prior art processes, without leading to molecular weight broadening of the products obtained thereby.

BRIEF SUMMARY OF THE INVENTION

It has been found that, surprisingly, cationically polymerizable monomers can be polymerized under the conditions of a living cationic polymerization to products with a narrow molecular weight distribution at significantly higher temperatures than in the prior art when the reactants, before being introduced into the reaction zone, are mixed in at least one mixer with microstructures.

The invention thus provides a process for continuously polymerizing cationically polymerizable monomers, comprising the following steps:

(a) providing at least two liquid streams, the at least two streams each comprising one or more of the following components: at least one cationically polymerizable monomer, at least one initiator, at least one catalyst and if appropriate at least one electron donor, with the proviso that that stream which comprises the at least one catalyst does not comprise any initiator or any electron donor;

(b) mixing the at least two liquid streams to obtain a reaction mixture, where, in the case that more than two liquid streams are provided in step (a), the streams can be mixed successively or simultaneously, and where at least one mixing operation can be carried out in a mixer with microstructures; and (c) polymerizing the reaction mixture in one reaction zone.

BRIEF DESCRIPTION OF THE DRAWINGS

FIG. 1. depicts one embodiment of an apparatus and process of the invention.

DETAILED DESCRIPTION OF THE INVENTION

In the context of the present invention, the generic terms below have the following definitions, unless definitions explicitly deviating therefrom are specified:

Alkyl is understood to mean a linear or branched, saturated hydrocarbon radical having generally from 1 to 20 carbon atoms (═$C_1$-$C_{20}$-alkyl), and preferably from 1 to 10 carbon atoms (═$C_1$-$C_{10}$-alkyl).

$C_1$-$C_4$-Alkyl is a linear or branched alkyl group having from 1 to 4 carbon atoms. Examples thereof are methyl, ethyl, n-propyl, isopropyl, n-butyl, sec-butyl, isobutyl and tert-butyl.

$C_1$-$C_6$-Alkyl is a linear or branched alkyl group having from 1 to 6 carbon atoms. Examples thereof are, in addition to the radicals specified above for $C_1$-$C_4$-alkyl, n-pentyl, 1-methylbutyl, 2-methylbutyl, 3-methylbutyl, 2,2-dimethylpropyl, 1-ethylpropyl, 1,1-dimethylpropyl, 1,2-dimethylpropyl, n-hexyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, 1-ethyl-2-methylpropyl and further constitutional isomers thereof.

$C_1$-$C_8$-Alkyl is a linear or branched alkyl group having from 1 to 8 carbon atoms. Examples thereof are the above-mentioned $C_1$-$C_6$-alkyl radicals and additionally heptyl, octyl, and constitutional isomers thereof such as 2-ethylhexyl.

$C_1$-$C_{10}$-Alkyl is a linear or branched alkyl group having from 1 to 10 carbon atoms. Examples thereof are the above-mentioned $C_1$-$C_8$-alkyl radicals and additionally nonyl, decyl and constitutional isomers thereof.

$C_1$-$C_{20}$-Alkyl is a linear or branched alkyl group having from 1 to 20 carbon atoms. Examples thereof are the above-mentioned $C_1$-$C_{10}$-alkyl radicals and additionally undecyl, dodecyl, tridecyl, tetradecyl, pentadecyl, hexadecyl, heptadecyl, octadecyl, nonadecyl, eicosyl and constitutional isomers thereof.

Aryl is a carbocyclic aromatic hydrocarbon radical having generally from 6 to 20 carbon atoms (═$C_6$-$C_{20}$-aryl), such as phenyl, naphthyl, anthracenyl or phenanthrenyl, and comparable groups which may have one or more $C_1$-$C_{10}$-alkyl groups as substituents, for example tolyl, isopropylphenyl, xylyl or tert-butylphenyl. Aryl is preferably phenyl, naphthyl or tolyl. More particularly, aryl is phenyl which may be substituted as described, and especially unsubstituted phenyl.

Arylalkyl is an alkyl group which bears at least one aryl radical and is preferably aryl-$C_1$-$C_{20}$-alkyl. Aryl-$C_1$-$C_{20}$-alkyl is a $C_1$-$C_{20}$-alkyl group which bears at least one aryl radical. Examples thereof are benzyl, 1- and 2-phenylethyl, 1-, 2- and 3-phenylpropyl, 1-, 2-, 3- and 4-phenylbutyl, 1-, 2-, 3-, 4- and 5-phenylpentyl, 1-, 2-, 3-, 4-, 5- and 6-phenylhexyl, 1-, 2-, 3-, 4-, 5-, 6- and 7-phenylheptyl, 1-, 2-, 3-, 4-, 5-, 6-, 7- and 8-phenyloctyl, 1-, 2-, 3-, 4-, 5-, 6-, 7-, 8- and 9-phenylnonyl, 1-, 2-, 3-, 4-, 5-, 6-, 7-, 8-, 9- and 10-phenyldecyl, 1-, 2-, 3-, 4-, 5-, 6-, 7-, 8-, 9-, 10- and 11-phenylundecyl, phenyldodecyl, phenyltridecyl, phenyltetradecyl, phenylpentadecyl, phenylhexadecyl, phenylheptadecyl, phenyloctadecyl, phenylnonadecyl and phenyleicosyl, and constitutional isomers thereof.

More preferably, arylalkyl is aryl-$C_1$-$C_{10}$-alkyl. Aryl-$C_1$-$C_{10}$-alkyl is a $C_1$-$C_{10}$-alkyl group which bears at least one aryl radical. Examples thereof are benzyl, 1- and 2-phenylethyl, 1-, 2- and 3-phenylpropyl, 1-, 2-, 3- and 4-phenylbutyl, 1-, 2-, 3-, 4- and 5-phenylpentyl, 1-, 2-, 3-, 4-, 5- and 6-phenylhexyl, 1-, 2-, 3-, 4-, 5-, 6- and 7-phenylheptyl, 1-, 2-, 3-, 4-, 5-, 6-, 7- and 8-phenyloctyl, 1-, 2-, 3-, 4-, 5-, 6-, 7-, 8- and 9-phenylnonyl, 1-, 2-, 3-, 4-, 5-, 6-, 7-, 8-, 9- and 10-phenyldecyl, and constitutional isomers thereof. Arylalkyl is preferably benzyl or 2-phenylethyl.

More particularly, arylalkyl is aryl-$C_1$-$C_4$-alkyl. Aryl-$C_1$-$C_4$-alkyl is a $C_1$-$C_4$-alkyl group which bears at least one aryl radical. Examples thereof are benzyl, 1- and 2-phenylethyl, 1-, 2- and 3-phenylpropyl and 1-, 2-, 3- and 4-phenylbutyl. Aryl-$C_1$-$C_4$-alkyl is especially benzyl or 2-phenylethyl.

Alkylene is, for example, $C_2$-$C_5$-alkylene, such as 1,2-ethylene, 1,2- and 1,3-propylene, 1,4-butylene and 1,5-pentylene.

Alkyloxy (alkoxy) is an alkyl radical bonded via an oxygen atom. Accordingly, aryloxy, cycloalkyloxy and arylalkyloxy are, respectively, an aryl, cycloalkyl and arylalkyl bonded via an oxygen atom.

$C_1$-$C_4$-Alkoxy is a $C_1$-$C_4$-alkyl radical as defined above which is bonded via an oxygen atom. Examples are methoxy, ethoxy, propoxy, isopropoxy, butoxy, sec-butoxy, isobutoxy and tert-butoxy.

$C_1$-$C_6$-Alkoxy is a $C_1$-$C_6$-alkyl radical as defined above which is bonded via an oxygen atom. In addition to the radicals specified above for $C_1$-$C_4$-alkoxy, examples are pentoxy, hexoxy and constitutional isomers thereof.

$C_1$-$C_8$-Alkoxy is a $C_1$-$C_8$-alkyl radical as defined above which is bonded via an oxygen atom. In addition to the radicals specified above for $C_1$-$C_6$-alkoxy, examples are heptyloxy, octyloxy and constitutional isomers thereof.

$C_1$-$C_{10}$-Alkoxy is a $C_1$-$C_{10}$-alkyl radical as defined above which is bonded via an oxygen atom. In addition to the radicals specified above for $C_1$-$C_8$-alkoxy, examples are nonyloxy, decyloxy and constitutional isomers thereof.

Acyloxy (alkylcarbonyloxy) is an alkylcarbonyl radical which is bonded via oxygen and has preferably from 1 to 6 carbon atoms in the alkyl moiety (=$C_1$-$C_6$-alkylcarbonyloxy). $C_1$-$C_6$-Alkylcarbonyloxy is a $C_1$-$C_6$-alkyl radical as defined above which is bonded via a carbonyloxy group (C(O)O). Examples thereof are acetyloxy, propionyloxy, butyroxy, sec-butyroxy, isobutyroxy, tert-butyroxy, pentylcarbonyloxy, hexylcarbonyloxy and constitutional isomers thereof.

Cycloalkyl is generally $C_3$-$C_8$-cycloalkyl, i.e. a saturated carbocycle having 3, 4, 5, 6, 7 or 8 carbon atoms as ring members, such as cyclopropyl, cyclobutyl, cyclopentyl, cyclohexyl, cycloheptyl or cyclooctyl. The cycloalkyl radical may optionally have one or more $C_1$-$C_{10}$-alkyl groups as substituents.

$C_3$-$C_7$-Cycloalkyl is a saturated carbocycle having 3, 4, 5, 6 or 7 carbon atoms as ring members, for example cyclopropyl, cyclopentyl, cyclohexyl and cycloheptyl. $C_5$-$C_7$-Cycloalkyl is a saturated carbocycle having 5, 6 or 7 carbon atoms as ring members, for example cyclopentyl, cyclohexyl and cycloheptyl.

Halogen is fluorine, chlorine, bromine or iodine and especially fluorine, chlorine or bromine.

The statements below regarding individual preferred features of the process according to the invention and of the inventive apparatus apply both taken alone and in any combination with one another.

The term "liquid streams" relates to the state of matter as present under the conditions of step (b). For example, a component which is gaseous at room temperature (25° C.) and atmospheric pressure can be provided as a liquid stream when it is initially charged under the temperature and/or pressure conditions of step (b) (e.g. low temperature and/or elevated pressure).

In the context of the present invention, a reaction zone is understood to mean a section of a reactor in flow direction of the liquid streams in which the polymerization proceeds. A reaction zone may be disposed within one part of a reactor, within an individual reactor or within two or more reactors. In a preferred embodiment, each reaction zone is disposed in a separate reactor.

Useful monomers for polymerization include all ethylenically unsaturated monomers which are polymerizable under cationic polymerization conditions. Examples thereof are linear alkenes, such as ethene, propene, the n-butenes such as 1- and 2-n-butene, the n-pentenes such as 1- and 2-n-pentene, and the n-hexenes such as 1-, 2- and 3-n-hexene, alkadienes such as butadiene and isoprene, isoalkenes such as isobutene, 2-methylbutene-1,2-methylpentene-1,2-methylhexene-1,2-ethylpentene-1,2-ethylhexene-1 and 2-propylheptene-1, cycloalkenes such as cyclopentene and cyclohexene, vinyl aromatic compounds such as styrene, α-methylstyrene, 2-, 3- and 4-methylstyrene, 4-tert-butylstyrene and 2-, 3- and 4-chlorostyrene, and olefins which have a silyl group, such as 1-trimethoxysilylethene, 1-(trimethoxysilyl)propene, 1-(trimethoxysilyl)-2-methylpropene-2,1-[tri(methoxyethoxy)silyl]ethene, 1-[tri(methoxyethoxy)silyl]propene and 1-[tri(methoxyethoxy)silyl]-2-methylpropene-2, and mixtures of these monomers.

Preferred monomers are isobutene, isobutenic monomer mixtures, vinylaromatic compounds such as styrene, styrenic monomer mixtures, styrene derivatives, especially α-methylstyrene and 4-methylstyrene, the abovementioned cycloalkenes, the abovementioned alkadienes and mixtures thereof.

Particularly preferred monomers are isobutene, isobutenic monomer mixtures, vinylaromatics, especially styrene and styrenic monomer mixtures, and mixtures of the aforementioned monomers. In particular, isobutene, styrene or mixtures thereof are used as monomers in the polymerization process according to the invention. The process according to the invention serves especially for the polymerization of isobutene or isobutenic monomer mixtures and even more especially of isobutene.

When isobutene or isobutenic monomer mixture is used as the monomer to be polymerized, a suitable isobutene source is either isobutene itself or isobutenic $C_4$ hydrocarbon streams, for example $C_4$ raffinates, $C_4$ cuts from isobutene dehydrogenation, $C_4$ cuts from steamcrackers and from FCC crackers (fluid catalyzed cracking), provided that they have been substantially freed of 1,3-butadiene present therein. Suitable C$_4$ hydrocarbon streams comprise generally less than 500 ppm, preferably less than 200 ppm, of butadiene. The presence of 1-butene and of cis- and trans-2-butene is substantially uncritical. Typically, the isobutene concentration in the C$_4$ hydrocarbon streams is in the range from 40 to 60% by weight. The isobutenic monomer mixture may comprise small amounts of contaminants, such as water, carboxylic acids or mineral acids, without there being critical yield or selectivity losses. It is appropriate to the purpose to avoid enrichment of these impurities by removing such harmful substances from the isobutenic monomer mixture, for example by adsorption on solid adsorbents such as activated carbon, molecular sieves or ion exchangers.

Suitable catalysts are Lewis acids. Useful Lewis acids include covalent metal halides and semimetal halides which have an electron pair vacancy. Such compounds are known to those skilled in the art, for example from J. P. Kennedy et al. in U.S. Pat. Nos. 4,946,889, 4,327,201, 5,169,914, EP-A-206 756, EP-A-265 053, and comprehensively in J. P. Kennedy, B. Ivan, "Designed Polymers by Carbocationic Macromolecular Engineering", Oxford University Press, New York, 1991. They are generally selected from halogen compounds of titanium, of tin, of zinc, of aluminum, of vanadium or of iron, and the halides of boron. Preference is given to the chlorides, and in the case of aluminum also to the monoalkylaluminum dichlorides and the dialkylaluminum chlorides. Preferred Lewis acids are titanium tetrachloride, boron trichloride, boron trifluoride, tin tetrachloride, zinc dichloride, aluminum trichloride, vanadium pentachloride, iron trichloride, alkylaluminum dichlorides and dialkylaluminum chlorides. Particularly preferred Lewis acids are titanium tetrachloride, boron trichloride and ethylaluminum dichloride, and especially titanium tetrachloride. Alternatively, it is also possible to use a mixture of at least Lewis acids, for example boron trichloride in a mixture with titanium tetrachloride. However, especially titanium tetrachloride is used.

The initiator is an organic compound which has at least one functional group FG which can form a carbocation or a cationic complex with the Lewis acid under polymerization conditions. The terms "carbocation" and "cationic complex" are not strictly separated from one another, but comprise all intermediate stages of solvent-separated ions, solvent-separated ion pairs, contact ion pairs and strongly polarized complexes with positive partial charge on a carbon atom of the initiator molecule.

Suitable initiators are in principle all organic compounds which have at least one nucleophilically displaceable leaving group X and which can stabilize a positive charge or partial charge on the carbon atom which bears the leaving group X. As is well known, these include compounds which have at least one leaving group X which is bonded to a secondary or tertiary aliphatic carbon atom or to an allylic or benzylic carbon atom. Useful leaving groups in accordance with the invention are halogen, alkoxy, preferably C$_1$-C$_6$-alkoxy, and acyloxy (alkylcarbonyloxy), preferably C$_1$-C$_6$-alkylcarbonyloxy.

Halogen here is, in particular, chlorine, bromine or iodine, and especially chlorine. C$_1$-C$_6$-Alkoxy may be either linear or branched, and is, for example, methoxy, ethoxy, n-propoxy, isopropoxy, n-butoxy, isobutoxy, n-pentoxy and n-hexoxy, especially methoxy. C$_1$-C$_6$-Alkylcarbonyloxy is, for example, acetoxy, propionyloxy, n-butyroxy and isobutyroxy, especially acetoxy.

Preference is given to those initiators in which the functional group has the general formula FG

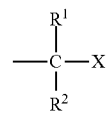

in which
X is selected from halogen, C$_1$-C$_6$-alkoxy and C$_1$-C$_6$-acyloxy,
R$^1$ is hydrogen or methyl and
R$^2$ is methyl or, with R$^1$ or the molecular moiety to which the functional group FG is bonded, forms a C$_5$-C$_6$-cycloalkyl ring, or R$^2$ may also be hydrogen when the functional group FG is bonded to an aromatic or olefinically unsaturated carbon atom.

The initiators have preferably one, two, three or four and especially one or two functional groups FG, and more preferably one functional group FG. X in formula (FG) is preferably a halogen atom, especially chlorine.

Preferred initiators obey the general formulae I-A to I-F:

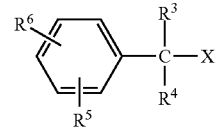

I-A

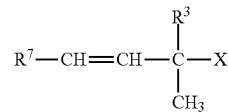

I-B

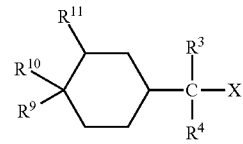

I-C

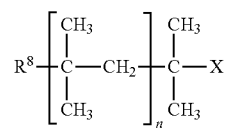

I-D

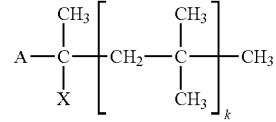

I-E

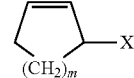

I-F in which
X is as defined above;
n and k are each independently 0, 1, 2, 3, 4 or 5;
m is 1, 2 or 3;
R$^3$, R$^4$ and R$^{10}$ are each independently hydrogen or methyl;
R$^5$, R$^6$ and R$^7$ are each independently hydrogen, C$_1$-C$_4$-alkyl or a CR$^3$R$^4$—X group in which R$^3$, R$^4$ and X are each as defined above;
R$^8$ is hydrogen, methyl or an X group; and
R$^9$ and R$^{11}$ are each independently hydrogen or an X group; and A is an ethylenically unsaturated hydrocarbon radical which has a vinyl group or a cycloalkenyl group.

In the formulae I-A to I-C, $R^3$ and $R^4$ are preferably both methyl. In the formula I-A, $R^6$ is, for example, a $CR^3R^4$—X group which is arranged in the para or meta position to the $CR^3R^4X$ group, especially when $R^5$ is hydrogen. It may also be in the meta position when the $R^5$ group is $C_1$-$C_4$-alkyl or a $CR^3R^4$—X group. Preferred compounds I-A are, for example: 2-chloro-2-phenylpropane (cumyl chloride) and 1,4-bis(2-chloro-2-propyl)benzene (1,4-dicumyl chloride, 1,4-DCC) or 1,3-bis(2-chloro-2-propyl)benzene (1,3-dicumyl chloride, 1,3-DCC).

Examples of compounds of the formula I-B are allyl chloride, methallyl chloride, 2-chloro-2-methylbutene-2 and 2,5-dichloro-2,5-dimethylhexene-3.

In the compounds I-C, $R^3$ is preferably methyl. $R^9$ is preferably an X group, and especially halogen, especially when $R^{10}$ is methyl. Examples of compounds of the general formula I-C are 1,8-dichloro-4-p-menthane (limonene dihydrochloride), 1,8-dibromo-4-p-menthane (limonene dihydrobromide), 1-(1-chloroethyl)-3-chlorocyclohexane, 1-(1-chloroethyl)-4-chlorocyclohexane, 1-(1-bromoethyl)-3-bromocyclohexane and 1-(1-bromoethyl)-4-bromocyclohexane.

Among the compounds of the formula I-D, preference is given to those in which $R^9$ is a methyl group. Preference is also given to compounds of the general formula I-D in which $R^9$ is an X group and is especially a halogen atom when n>0. More preferably, however, n is 0 or 1 and especially 1, and $R^9$ is methyl.

In compounds I-E, A is a hydrocarbon radical having generally from 2 to 21 carbon atoms, which has either a vinyl group ($CH_2$=CH—) or a $C_5$-$C_8$-cycloalkenyl radical, e.g. cyclopenten-3-yl, cyclopenten-4-yl, cyclohexen-3-yl, cyclohexen-4-yl, cyclohepten-3-yl, cyclohepten-4-yl, cycloocten-3-yl, cycloocten-4-yl or cycloocten-5-yl.

Preferably, A is a radical of the formulae A.1, A.2 or A.3

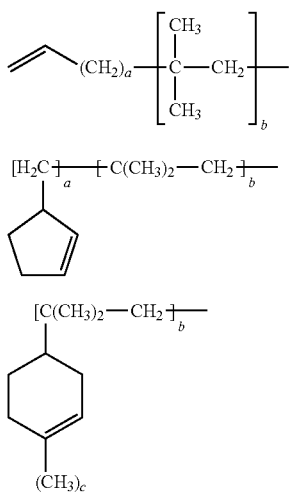

in which
a is 0 or 1;
b is from 0 to 3, especially 0, 1 or 2, and
c is 0 or 1.

In compounds I where A=A.2, a is preferably 1.
In compounds I where A=A.3, b is preferably 0. c is preferably 1.

Examples of initiator compounds I-E are 2-chloro-2-methylbutene-3, 2-chloro-2-methylpentene-4, 2-chloro-2,4,4-trimethylhexene-5, 2-chloro-2-methyl-3-(cyclopenten-3-yl)propane, 2-chloro-2-methyl-4-(cyclohexen-4-yl)pentane and 2-chloro-2-(1-methylcyclohexen-4-yl)propene.

In compounds of the formula I-F, X is preferably chlorine. m is preferably 1 or 2 and more preferably 1. A preferred compound of the formula I-F is 3-chlorocyclopentene.

Particular preference is given to using, as initiators, compounds of the formula I-D and especially tert-butyl chloride or 4-chloro-2,2,4-trimethylpentane (diisobutyl chloride; trimethylpentyl chloride).

The above-described initiators and processes for their preparation are known and are described, for example, in WO 02/48215 or WO 03/074577.

In a preferred embodiment, at least one of the streams provided in step (a) comprises at least one electron donor.

Useful electron donors include aprotic organic compounds which have a free electron pair disposed on a nitrogen, oxygen or sulfur atom. Preferred donor compounds are selected from pyridines such as pyridine itself, 2,6-dimethylpyridine, and sterically hindered pyridines such as 2,6-diisopropylpyridine and 2,6-di-tert-butylpyridine; amides, especially N,N-dialkylamides of aliphatic or aromatic carboxylic acids such as N,N-dimethylacetamide; lactams, especially N-alkyllactams such as N-methylpyrrolidone; ethers, e.g. dialkyl ethers such as diethyl ether and diisopropyl ether, cyclic ethers such as tetrahydrofuran; amines, especially trialkylamines such as triethylamine; esters, especially $C_1$-$C_4$-alkyl esters of aliphatic $C_1$-$C_6$-carboxylic acids such as ethyl acetate; thioethers, especially dialkyl thioethers or alkyl aryl thioethers, such as methyl phenyl sulfide; sulfoxides, especially dialkyl sulfoxides such as dimethyl sulfoxide; nitriles, especially alkyl nitriles such as acetonitrile and propionitrile; phosphines, especially trialkylphosphines or triarylphosphines, such as trimethylphosphine, triethylphosphine, tri-n-butylphosphine and triphenylphosphine, and unpolymerizable, aprotic organic silicon compounds which have at least one organic radical bonded via oxygen.

Particularly preferred electron donor compounds are selected from pyridines and unpolymerizable, aprotic organic silicon compounds which have at least one organic radical bonded via oxygen.

More particularly, the electron donor compounds are selected from unpolymerizable, aprotic organic silicon compounds which have at least one organic radical bonded via oxygen. Examples of such radicals are alkyloxy, cycloalkyloxy, aryloxy, arylalkyloxy and acyloxy (alkylcarbonyloxy).

The organosilicon compounds may have one or more, for example 2 or 3, silicon atoms having at least one organic radical bonded via oxygen. Preference is given to those organosilicon compounds which have one, two or three, and especially 2 or 3, organic radicals bonded via oxygen per silicon atom.

Particularly preferred organosilicon compounds of this type are those of the following general formula:

$R^a_r Si(OR^b)_{4-r}$ in which
r is 1, 2 or 3,
$R^a$ may be the same or different and are each independently $C_1$-$C_{20}$-alkyl, $C_3$-$C_7$-cycloalkyl, aryl or aryl-$C_1$-$C_4$-alkyl, where the three latter radicals may also have one or more $C_1$-$C_{10}$-alkyl groups as substituents, and
$R^b$ are the same or different and are each $C_1$-$C_{20}$-alkyl or, in the case that r is 1 or 2, two $R^b$ radicals together may be alkylene.

In the above formula, r is preferably 1 or 2. $R^a$ is preferably a $C_1$-$C_8$-alkyl group, and especially an alkyl group which is branched or bonded via a secondary carbon atom, such as isopropyl, isobutyl, sec-butyl, or a 5-, 6- or 7-membered cycloalkyl group, or an aryl group, especially phenyl. The variable $R^b$ is preferably a $C_1$-$C_4$-alkyl group, or a phenyl, tolyl or benzyl radical.

Examples of preferred compounds of this type are dimethoxydiisopropylsilane, dimethoxyisobutylisopropylsilane, dimethoxydiisobutylsilane, dimethoxydicyclopentylsilane, dimethoxyisobutyl-2-butylsilane, diethoxyisobutylisopropylsilane, triethoxytolylsilane, triethoxybenzylsilane and triethoxyphenylsilane. Especially triethoxyphenylsilane is used.

In step (a) of the process according to the invention, at least two liquid streams, for example two, three or four streams, which comprise the reactants required for the polymerization are provided. Preference is given to providing two or three streams and especially three streams.

The streams must be liquid, i.e. when one of the components is not liquid under the given conditions of steps (a), (b) and (c), and especially (b) and (c), it must be present dissolved in a solvent.

Useful solvents include all low molecular weight organic compounds or mixtures thereof which have a suitable dielectric constant and no abstractable protons and which are liquid under the mixing and polymerization conditions. Preferred solvents are hydrocarbons, for example acyclic hydrocarbons having from 2 to 8 and preferably from 3 to 8 carbon atoms, especially alkanes such as ethane, propane, n-butane and isomers thereof, n-pentane and isomers thereof, n-hexane and isomers thereof, n-heptane and isomers thereof, and n-octane and isomers thereof, cyclic alkanes having from 5 to 8 carbon atoms, such as cyclopentane, methylcyclopentane, cyclohexane, methylcyclohexane, cycloheptane, acyclic alkenes having preferably from 2 to 8 carbon atoms, such as ethane, propene, n-butene, n-pentene, n-hexene and n-heptene, cyclic olefins such as cyclopentene, cyclohexene and cycloheptene, aromatic hydrocarbons such as toluene, xylene, ethylbenzene, and halogenated hydrocarbons, such as halogenated aliphatic hydrocarbons, for example chloromethane, dichloromethane, trichloromethane, chloroethane, 1,2-dichloroethane and 1,1,1-trichloroethane and 1-chlorobutane, and halogenated aromatic hydrocarbons such as chlorobenzene, 1,2-dichlorobenzene and fluorobenzene. The halogenated hydrocarbons used as solvents do not comprise any compounds in which halogen atoms reside on secondary or tertiary carbon atoms.

Particularly preferred solvents are the abovementioned alkanes, especially hexane and heptane, and the halogenated alkanes, especially methylene chloride and chlorobutane, and mixtures thereof. More preferred are solvent mixtures which comprise at least one halogenated hydrocarbon, especially at least one chloroalkane, and at least one aliphatic hydrocarbon, especially at least one alkane. The solvent mixture especially comprises hexane and chlorobutane. The volume ratio of hydrocarbon to halogenated hydrocarbon is preferably in the range from 1:10 to 10:1, more preferably in the range from 4:1 to 1:4 and especially in the range from 3:1 to 1:3.

When solvent mixtures are used, the mixtures may also not be formed until during the mixing operation (b), for example by mixing of two or more streams which comprise different solvents. This procedure offers the advantage that different components, such as monomer, catalyst, initiator or electron donor, which have a sufficiently good solubility in different solvents are first dissolved in the solvent which is optimal for each one and only come into contact with a less optimal solvent in the course of mixing in step (b). In this way, metering and blockage problems in the transfer of the streams provided into the mixing step (b) are avoided.

The streams provided in step (a) may comprise only individual components (for example monomer, catalyst, initiator or electron donor, in each case optionally in a solvent (mixture)), or else mixtures of the individual components. The components may in principle be combined with one another as desired, but with the proviso that the catalyst must not be provided in a mixture either with the initiator or with the electron donor, since these components would already react with one another before they reach the mixer(s) or in any case before they reach the reaction zone, which would impair the polymerization reaction.

In a preferred embodiment, in step (a),
(i-1) at least one liquid stream which comprises at least one cationically polymerizable monomer and if appropriate at least one electron donor and if appropriate at least one solvent;
(ii-1) at least one liquid stream which comprises at least one initiator and if appropriate at least one electron donor and if appropriate at least one solvent; and
(iii-1) at least one liquid stream which comprises at least one catalyst and if appropriate at least one solvent;
are provided.

It is particularly preferred when
(i-1) at least one liquid stream which comprises at least one cationically polymerizable monomer and if appropriate at least one solvent;
(ii-1) at least one liquid stream which comprises at least one initiator and if appropriate at least one electron donor and if appropriate at least one solvent; and
(iii-1) at least one liquid stream which comprises at least one catalyst and if appropriate at least one solvent;
are provided.

It is more preferred when
(i-1) at least one liquid stream which comprises at least one cationically polymerizable monomer and if appropriate at least one solvent;
(ii-1) at least one liquid stream which comprises at least one initiator and at least one electron donor and if appropriate at least one solvent; and
(iii-1) at least one liquid stream which comprises at least one catalyst and if appropriate at least one solvent;
are provided.

It is even more preferred when
(i-1) a liquid stream which comprises at least one cationically polymerizable monomer and if appropriate at least one solvent;
(ii-1) a liquid stream which comprises at least one initiator and at least one electron donor and if appropriate at least one solvent; and
(iii-1) a liquid stream which comprises at least one catalyst and if appropriate at least one solvent.

In an alternative embodiment, in step (a),
(i-2) at least one liquid stream which comprises at least one cationically polymerizable monomer and at least one catalyst and if appropriate at least one solvent; and
(ii-2) at least one liquid stream which comprises at least one initiator and if appropriate at least one electron donor and if appropriate at least one solvent;
are provided.

In an alternative embodiment, in step (a),
(i-3) at least one liquid stream which comprises at least one cationically polymerizable monomer and at least one catalyst and if appropriate at least one solvent;

(ii-3) at least one liquid stream which comprises at least one initiator and if appropriate at least one solvent; and (iii-3) at least one liquid stream which comprises at least one electron donor and if appropriate at least one solvent;

are provided.

Since the provision of a stream which, as well as the at least one cationically polymerizable monomer, also comprises at least one catalyst places particularly high demands on the absence of protic compounds, especially of water, since the polymerization of the monomer can otherwise already set in before the reaction zone is reached, the two latter alternative embodiments [=provision of streams (i-2) and (ii-2) or of (i-3), (ii-3) and (iii-3) in step (a)] are less preferred than the remaining embodiments mentioned above and below [=provision of streams (i-1), (ii-1) and (iii-1) or of (i-4), (ii-4), (iii-4) and (iv-4) in step (a)].

In an alternatively preferred embodiment, in step (a), (i-4) at least one liquid stream which comprises at least one cationically polymerizable monomer and if appropriate at least one solvent;

(ii-4) at least one liquid stream which comprises at least one initiator and if appropriate at least one solvent;

(iii-4) if appropriate at least one liquid stream which comprises at least one electron donor and if appropriate at least one solvent; and (iv-4) at least one liquid stream which comprises at least one catalyst and if appropriate at least one solvent;

is provided.

More particularly, in step (a), however, (i-1) at least one liquid stream which comprises at least one cationically polymerizable monomer and if appropriate at least one solvent;

(ii-1) at least one liquid stream which comprises at least one initiator and at least one electron donor and if appropriate at least one solvent; and (iii-1) at least one liquid stream which comprises at least one catalyst and if appropriate at least one solvent;

are provided.

Especially, in step (a), (i-1) a liquid stream which comprises at least one cationically polymerizable monomer and if appropriate at least one solvent;

(ii-1) a liquid stream which comprises at least one initiator and at least one electron donor and if appropriate at least one solvent; and (iii-1) a liquid stream which comprises at least one catalyst and if appropriate at least one solvent;

are provided.

Preference is given to providing the at least one catalyst, the at least one initiator and the at least one electron donor in at least one solvent.

Accordingly, in step (a), even more especially, (i-1) a liquid stream which comprises at least one cationically polymerizable monomer and if appropriate at least one solvent;

(ii-1) a liquid stream which comprises at least one initiator and at least one electron donor and if appropriate at least one solvent; and (iii-1) a liquid stream which comprises at least one catalyst and at least one solvent;

are provided.

Some cationically polymerizable monomers are liquid at the suitable mixing and reaction temperatures (see below) and can therefore also be provided without solvent. If, however, this is not the case, the monomers are also provided dissolved in a solvent.

With regard to suitable and preferred monomers, catalysts, initiators and electron donor compounds, and also solvents, reference is made to the above remarks.

The solvents suitable for the particular component (monomer, catalyst, initiator, electron donor) are determined by the physical properties of the compound to be dissolved, such as dielectric constant, stability in the particular solvent, etc., and are known in principle to those skilled in the art or can be determined with the aid of simple preliminary tests.

The liquid streams provided in step (a) are subsequently subjected to the mixing step (b).

In a preferred embodiment, the liquid streams are mixed at or below the reaction temperature of the subsequent polymerization. The reaction temperature is defined as the temperature at which the polymerization is carried out in the reaction zone. Where it is a temperature range, what is meant is the lowest temperature established in the reaction zone. This allows initiation of the reaction mixture during the mixing operation to be avoided and a defined reaction start and defined residence times in the downstream polymerization to be obtained.

Preference is given to mixing at from −100 to 10° C. more preferably from −80 to 0° C., even more preferably from −80 to −20° C., particularly preferably from −80 to −30° C., in particular from −70 to −30° C. and especially from −70 to −40° C.

The mixing temperature is generally established through the temperature of the streams provided in step (a) (i.e. cooling of the streams to the desired mixing temperature). In addition, however, the mixers themselves may also be cooled, which is a possibility especially when the mixing operation proceeds exothermically.

In a first preferred embodiment, the liquid streams are mixed in one stage in a mixer with microstructures (=micromixer). For this purpose, all liquid streams provided in step (a) are conducted into a micromixer and mixed.

In an alternatively preferred embodiment, the liquid streams are mixed in a plurality of stages, at least the last mixer in flow direction before entry into the reaction zone being a mixer with microstructures.

The multistage mixing is of course effected only when at least three liquid streams are to be mixed.

In the case of multistage mixing, preference is given to mixing in the stream or streams which comprise(s) the at least one catalyst as the last component, in order to prevent the polymerization from setting in too early, i.e. before entry of the reaction mixture obtained in step (b) into the reaction zone. Preferably, at least that mixer in which the stream(s) which comprise(s) the at least one catalyst is/are mixed in is a micromixer.

Preference is given to multistage mixing.

Preferably, the at least one monomer, the at least one initiator and the optionally used at least one electron donor are mixed in a first mixer and this mixture is then mixed with the at least one catalyst in a second mixer. In this case, the at least one initiator, the optionally used at least one electron donor and the at least one catalyst are preferably used dissolved in a solvent. When the at least one monomer is not liquid at the mixing temperature, it is preferably likewise used dissolved in a solvent.

Preferably, at least the second mixer is a mixer with microstructures (micromixer). More preferably, both mixers are micromixers.

For the mixing, in the case of x components to be mixed in the particular mixer, x streams which comprise the individual components are provided and conducted into the mixer. Preference is given, however, to using premixtures. For example, a premixture of monomer, electron donor and if appropriate solvent or of initiator, electron donor and preferably solvent can first be prepared and provided as the first liquid stream and only then mixed with the further streams according to step (b). In the preparation of the premixture, it is possible to use either conventional mixers or micromixers. Conventional mixers are in most cases entirely adequate for the preparation of the premixture described here.

In a specific embodiment, in a first mixer, a first stream which comprises the at least one monomer, which, if appropriate, is present dissolved in at least one solvent, is mixed with a second stream which comprises the at least one initiator, if appropriate the at least one electron donor and at least one solvent, and this first mixture formed is conducted into a second mixer, where it is mixed with a third stream which comprises the at least one catalyst and at least one solvent. Preferably, at least the second mixer is a micromixer. More preferably, both mixers are micromixers.

The residence time in the individual mixers, and especially in that mixer in which the at least one catalyst is mixed in and which is preferably a micromixer, must be sufficiently short that no spontaneous polymerization sets in, since the mixer and especially a micromixer might otherwise become blocked and fail completely. The residence time in that mixer in which the at least one catalyst is mixed in is preferably less than one second. In the remaining mixers connected upstream of the mixer in which the at least one catalyst is mixed in, the residence time may be somewhat longer.

With regard to suitable and preferred mixers and especially micromixers, reference is made to the remarks regarding the inventive apparatus.

The reaction mixture obtained in step (b) is subsequently conducted into a reaction zone and subjected to the polymerization (step (c)).

The polymerization can be effected in one stage or in two or more than two stages, i.e. in 2, 3, 4, 5 or more stages. It is preferably effected in one stage.

In the case of a multistage polymerization, at least one additional stream (for example one, two, three, four or five streams) can be mixed in between at least two of the polymerization stages. This may be a monomer-containing stream, initiator-containing stream, electron donor-containing stream, catalyst-containing stream, a mixture thereof or any other stream.

In a preferred embodiment, the additional stream(s) is/are mixed in by means of a mixer with microstructures. Particular preference is given to using at least one reactor with mixing function for the mixing of this additional stream or of these additional streams and for the further reaction.

The process according to the invention allows the performance of the polymerization at significantly higher temperatures than the prior art processes. Accordingly, the polymerization is preferably performed at a temperature in the range from −70 to 10° C., more preferably from −60 to 10° C., even more preferably from −60 to 0° C., particularly preferably from −55 to −20° C., in particular from −55 to −25° C. and especially from −50 to −30° C.

The polymerization can of course be carried out equally successively at lower temperatures, for example at <−70° C. or <−80° C., for example in the range from −100 to <−70° C. or from −100 to <−80° C., which, though, is not preferred for purely energetic and economic reasons.

The polymerization temperature is established firstly by the temperature of the reaction mixture obtained in step (b). This temperature is in turn defined by the temperature of the streams provided in step (a) and if appropriate by cooling on the mixers. Since the polymerization generally proceeds exothermically, it is, on the other hand, frequently necessary that the reaction zone in which the polymerization takes place is also cooled. Accordingly, the reaction zone or the reactor in which it is disposed is preferably temperature-controllable and preferably has a good heat exchange capacity. With regard to suitable reaction zones or to reactors comprising them, reference is made to the remarks below regarding the inventive apparatus.

The polymerization is typically effected under atmospheric pressure, but it may also proceed under reduced or elevated pressure. A suitable pressure range is between 1 and 25 bar.

Especially in the case of isobutene as the monomer to be polymerized, the reaction pressure at reaction temperatures below −10° C. is of minor significance, since isobutene is present in condensed form at these temperatures and is thus virtually not compressible any further. Only at higher temperatures and/or in the case of use of even lower-boiling solvents such as ethene or propene is preference is given to working under elevated reaction pressure, for example at a pressure of from 3 to 20 bar.

The residence time in the reaction zone for the polymerization is preferably in the range from 5 sec to 120 min, more preferably in the range from 10 sec to 100 min, even more preferably in the range from 1 min to 100 min, even more preferably in the range from 2 min to 90 min and especially in the range from 5 min to 90 min.

It is self-evident that the polymerization is performed under substantially aprotic, especially under anhydrous, reaction conditions. Aprotic and anhydrous reaction conditions are understood to mean that, respectively, the water content and the content of protic impurities in the reaction mixture is less than 50 ppm and especially less than 5 ppm. In general, the feedstocks will therefore be dried physically and/or by chemical measures before use. In particular, it has been found to be useful to admix the unsaturated aliphatic or alicyclic hydrocarbons which are preferably used as solvents, after customary prepurification and predrying, with an organometallic compound, for example an organolithium, organomagnesium or organoaluminum compound, in an amount which is sufficient to remove the water traces from the solvent. It is also possible to proceed in a similar manner with the monomers to be polymerized, especially the isobutene or isobutenic mixtures. According to the degree of purity and type of the solvents and monomers, a distillation may also be sufficient in order to provide essentially anhydrous feedstocks.

The prepurification and predrying of the solvents and of the monomers are effected in a customary manner, preferably by treatment with solid dessicants such as molecular sieves or predried oxides such as aluminum oxide, silicon dioxide, calcium oxide or barium oxide. It is possible in an analogous manner to dry the feedstocks for which a treatment with metal alkyls is not an option, for example the initiator or vinylaromatic monomers. Distillative prepurification or predrying of the feedstocks is also possible.

The components (monomer, catalyst, initiator, electron donor) are provided in the streams in step (a) in such amounts and conducted into the mixing operation (b) with such flow rates that they react in the polymerization reaction in the following ratios:

The at least one catalyst (Lewis acid) is used in a total amount which is sufficient to form an initiator complex with the at least one initiator. The overall molar ratio of Lewis acid to initiator is preferably from 50:1 to 1:10, more preferably from 50:1 to 1:1, in particular from 25:1 to 1:1 and especially from 5:1 to 1:1. The ratio specified is based on initiators with a single FG group and has to be converted correspondingly in the case of use of initiators with two or more FG groups.

When a mixture of at least two polymerization-active Lewis acids is used, one of the Lewis acids is preferably present in excess. Polymerization-active Lewis acids are those which can also initiate the cationic polymerization individually in combination with the initiator. Especially, in the case of use of a boron trichloride/titanium tetrachloride mixture, the molar ratio of boron trichloride to titanium tetrachloride is preferably from 1.5:1 to 100:1, more preferably from 2:1 to 20:1 and especially from 5:1 to 10:1.

When the polymerization is performed in the presence of an electron donor, the molar ratio of Lewis acid to electron donor is generally from 10:1 to 1:10, preferably from 10:1 to 1:1, more preferably from 5:1 to 1:1.

The overall molar ratio of monomer to initiator is preferably from 2:1 to 10 000:1, more preferably from 5:1 to 10 000:1 and especially from 10:1 to 10 000:1.

In a preferred embodiment of the process according to the invention, at least one microstructured reaction zone is used for the polymerization in step (c). With regard to the definition of the microstructured reaction zones, reference is made to the remarks regarding the inventive apparatus.

Preference is given to polymerizing in step (c) in a single reaction zone which is preferably microstructured.

In a preferred embodiment of the process according to the invention, the heat transfer coefficient on the side of the reaction medium in the at least one reaction zone in step (c) is at least 50 W/m$^2$K, more preferably at least 100 W/m$^2$K, even more preferably at least 200 W/m$^2$K and especially at least 400 W/m$^2$K. The ratio of heat exchange area to reaction volume is preferably greater than 250 m$^2$/m$^3$, more preferably greater than 500 m$^2$/m$^3$, even more preferably greater than 1000 m$^2$/m$^3$ and especially greater than 2000 m$^2$/m$^3$.

The polymerization commences as the reaction mixture resides in the at least one reaction zone and leads to polymers with living chain ends. These have to be converted to stable compounds after the reaction has ended.

To this end, the product from the (last) reaction zone is conducted into a preferably stirred discharge vessel and subjected to termination of reaction.

To terminate the reaction, the living chain ends are deactivated, for example by adding a protic compound, especially by adding water, alcohols such as methanol, ethanol, n-propanol, isopropanol, n-butanol, isobutanol, sec-butanol or tert-butanol, or mixtures thereof with water.

Alternatively, the reaction can also be terminated continuously. To this end, downstream of the (last) reaction zone in flow direction, a liquid stream which comprises a termination reagent, for example one or more of the above-mentioned protic compounds, is fed in via a feed, and the mixture then flows through a delay zone, such that the living polymer chains are already deactivated upstream of the discharge vessel.

The process according to the invention affords polymers which comprise a functional group at least one terminus (chain end). These functional groups are preferably a halogen group, for example a —CH$_2$—C(CH$_3$)$_2$-halogen group in the case of polyisobutene. This is usually formed with a protic deactivator in the course of termination of reaction. The halogen atom in this terminal group stems generally from the initiator used for the polymerization. Halogen is preferably chlorine. In the case of use of initiators which comprise two functional groups FG, such as 1,3- or 1,4-dicumyl chloride, even telechelic (bifunctional) polymers are obtained, which comprise such a functional group at both termini (chain ends). Telechelic (bifunctional) polymers are also obtained when initiators which themselves comprise a functionality are used, for example initiators of the formulae I-B, I-E and I-F. The telechelic polymers are valuable intermediates for the preparation of further bifunctional polymer derivatives. Examples of the derivatization include the alkylation of phenols and the elimination of hydrogen halide from the terminal group to form an ethylenically unsaturated terminal group.

The terminal group, for example the —CH$_2$—C(CH$_3$)$_2$-halogen group in polyisobutene, can be converted to an ethylenically unsaturated radical (in the case of polyisobutene: methylidene double bond), for example, thermally, for example by heating to a temperature of from 70 to 200° C., preferably under reduced pressure, or by treatment with a base. Suitable bases are, for example, alkali metal alkoxides such as sodium methoxide, sodium ethoxide and potassium tert-butoxide, basic aluminum oxide, alkali metal hydroxides such as sodium hydroxide, and tertiary amines such as pyridine or tributylamine; cf. Kennedy et al., Polymer Bulletin 1985, 13, 435-439. Preference is given to using sodium ethoxide or potassium tert-butoxide.

However, it is also possible to obtain polymers terminated ethylenically at the chain end without introducing the halogen group beforehand (in the case of polyisobutene: CH$_2$=C(CH$_3$)$_2$-halogen). To this end, the living chain end(s) of the polymers is/are suitably reacted with a terminating reagent which adds an ethylenically unsaturated group onto the chain end.

Suitable terminating reagents are, for example, trialkylallylsilane compounds, for example trimethylallylsilane. The living chain ends are terminated by adding a trialkylallylsilane compound. The use of the allylsilanes leads to the termination of the polymerization with introduction of an allyl radical at the polymer chain end; cf. EP 264 214.

Another example of a terminating reagent is 1,1-diphenylethylene. In this case, the living chain ends are terminated by adding 1,1-diphenylethylene and a base, which introduces a diphenyl-substituted double bond at the chain end; cf. J. Feldthusen, B. Ivan, A. H. E. Müller and J. Kops, Macromol. Rep. 1995, A32, 639, J. Feldthusen, B. Ivan and A. H. E. Müller, Macromolecules 1997, 30, 6989 and Macromolecules 1998, 31, 578, DE-A 19648028 and DE-A 19610350.

In addition, conjugated dienes, for example butadiene, are suitable as terminating reagents. In this case, the reactive chain end is reacted with the conjugated diene and then deactivated as described above; cf. DE-A 40 25 961.

In the case of use of isobutene as the monomer, the resulting isobutene homopolymers have a number-average molecular weight ($M_n$) of preferably from 1000 to 20 000 daltons, more preferably from 1000 to 10 000 daltons and especially from 1000 to 8000 daltons. The polydispersity (ratio of the weight-average molecular weight ($M_w$) to the number-average molecular weight; PD=$M_w/M_n$) is preferably at most 2.0, more preferably at most 1.8, even more preferably at most 1.6, particularly preferably at most 1.5 and especially at most 1.4, for example at most 1.3 or at most 1.2.

The remarks regarding number-average and weight-average molecular weights made in the context of the present invention are based on values as determined by means of gel permeation chromatography (GPC) (polyisobutene standards).

When a solvent is used in the preparation of the polymers, it can be removed by customary processes known to those skilled in the art, for example by distillation under reduced pressure.

The process according to the invention allows the living continuous polymerization of cationically polymerizable compounds at significantly higher temperatures than corresponding prior art processes, without any deterioration in the product properties and especially the molecular weight distribution (PD) of the polymers. More particularly, the process according to the invention allows the preparation of polymers with a narrow molecular weight distribution, for whose preparation the prior art processes have to be carried out at temperatures which are at least 10° C., preferably at least 20° C., in particular at least 30° C. and especially even at least 50° C. lower than in the polymerization process according to the invention.

The invention further relates to an apparatus I for continuously preparing polymers, comprising:
- at least two reservoir vessels for liquid streams, the streams comprising at least one monomer-containing starting material, at least one initiator-containing starting material, at least one catalyst-containing starting material, if appropriate at least one electron donor-containing starting material and if appropriate at least one solvent,
- one feed each for the liquid streams from the at least two reservoir vessels,
- one or more mixers connected in series, to which the liquid streams are supplied and in which they are mixed to obtain a reaction mixture, at least the last mixer in flow direction before entry into the reaction zone(s) being equipped with microstructures,
- at least one reaction zone, of which at least one is microstructured, and
- a discharge vessel which, if appropriate, is provided with one or more addition and/or mixing devices.

The invention further relates to an apparatus II for continuously preparing polymers, comprising:
- at least three reservoir vessels for liquid streams, the streams comprising at least one monomer-containing starting material, at least one initiator-containing starting material, at least one catalyst-containing starting material, if appropriate at least one electron donor-containing starting material and if appropriate at least one solvent,
- one feed each for the liquid streams from the at least three reservoir vessels,
- one or more mixers connected in series, to which the liquid streams are supplied and in which they are mixed to obtain a reaction mixture, at least the last mixer in flow direction before entry into the reaction zone(s) being equipped with microstructures,
- at least one reaction zone, and
- a discharge vessel which, if appropriate, is provided with one or more addition and/or mixing devices.

Apparatuses I and II are suitable for the performance of the process according to the invention.

The remarks which follow are based both on apparatus I and on apparatus II, unless reference is made explicitly to only one of the apparatuses.

With regard to suitable and preferred monomers, catalysts, initiators, electron donors and solvents which are present in the liquid streams, reference is made to the above remarks.

The mixers used may be mixers known from the prior art. They may in principle be mixers with or without microstructures, provided that the conditions defined at the outset are met. Suitable mixers without microstructures, which are also referred to as "conventional" mixers in the context of the present application, are all mixers which are suitable for the continuous mixing of liquids and are sufficiently well known to those skilled in the art. They are selected according to the process technology requirements.

Conventional mixers differ from mixers with microstructures (=micromixers) by their characteristic dimension in the zone relevant for the mixing. In the context of the present invention, the characteristic dimension of a flow device, for example of a mixer, is understood to mean the smallest dimension at right angles to the flow direction. The characteristic dimension of a micromixer is significantly smaller than that of a conventional mixer (for example lower frequently at least by the factor of 10 or at least by the factor of 100 or at least by the factor of 1000) and is typically in the micrometer to millimeter range. The zone relevant for the mixing (relevant mixer region) depends on the particular mixer type and is known to those skilled in the art. In the context of the present invention, a micromixer shall be understood to mean one whose characteristic dimension is at most 10 000 μm. Accordingly, in the context of the present invention, the term "conventional mixer" refers to a mixer whose characteristic dimension is >10 mm.

The characteristic dimension of the mixer with microstructures used in accordance with the invention is at most 10 000 μm, for example from 1 μm to 10 000 μm or preferably from 10 to 10 000 μm or more preferably from 25 to 10 000 μm; preferably at most 8000 μm, for example from 1 to 8000 μm or preferably from 10 to 8000 μm or more preferably from 25 to 8000 μm; more preferably at most 5000 μm, for example from 1 to 5000 μm or preferably from 10 to 5000 μm or more preferably from 25 to 5000 μm; even more preferably at most 4000 μm, for example from 1 to 4000 μm or preferably from 10 to 4000 μm or more preferably from 25 to 4000 μm; particularly preferably at most 3000 μm, for example from 1 to 3000 μm or preferably from 10 to 3000 μm or more preferably from 25 to 3000 μm; and especially at most 1000 μm, for example from 1 to 1000 μm or preferably from 10 to 1000 μm or more preferably from 25 to 1000 μm. The optimal characteristic dimension arises here from the requirements on the mixing quality and the tendency of the mixing apparatus to become blocked. Mixers with microstructures are also referred to as micromixers.

Examples of suitable mixers without microstructures are both conventional dynamic mixers, for example mixing pumps and stirred tanks with continuous flow, and mixing apparatus installed into pipelines, for example baffle plates, orifice plates, jet mixers, T and Y pieces, and static mixers.

Examples of suitable micromixers are:
I. static mixers
  1.1. laminar diffusion mixers
    1.1.a) "chaotic-laminar" mixers, for example T mixers, Y mixers or cyclone mixers,
    1.1.b) multilamination mixers or interdigital mixers
  1.2. laminar diffusion mixers with convective crossmixing, for example shaped mixing channels or channels with secondary structures
  1.3. split-recombine mixers, for example caterpillar mixers
II. dynamic mixers, for example mixing pumps
III. combinations thereof;
these of course satisfying the abovementioned conditions for the characteristic dimension.

Suitable mixers are those with microstructures which have at least one mixing channel. The mixing in the micromixers can proceed in a laminar, laminar-chaotic or turbulent manner.

Micromixers preferred in accordance with the invention will be illustrated in detail hereinafter.

In laminar diffusion mixers, substreams of the fluid, which has been fanned out in a microstructure into a multitude of microscopically small flow lamellae with a thickness in the range from 10 to 2000 μm, especially from 20 to 1000 μm and in particular from 40 to 500 μm, are mixed exclusively by molecular diffusion at right angles to the main flow direction.

The mixer can be designed via the Fourier number $Fo = \tau/\tau_D$, which is the ratio of residence time in the mixer to the diffusion time between the individual flow lamellae. For the diffusion time $T_D$, $$T_D = \frac{s^2}{D}$$

in which
s is half the flow lamellar thickness [m]
D is the diffusion coefficient [m²/sec].

This ratio is selected to be greater than 1, preferably greater than 2, more preferably greater than 3 and especially greater than 4, in order to ensure very good molecular mixing of the streams at the outlet of the mixer.

Laminar diffusion mixers can be configured as simple T or Y mixers or as so-called multilamination mixers. In the case of the T or Y mixer, the two (or else more than two) substreams to be mixed are fed to an individual channel through a T- or Y-shaped arrangement. What is crucial for the transversal diffusion path $S_{Diff}$ here is the channel width $\delta_K$. Typical channel widths between 100 μm and 1 mm give rise to customary mixing times in the range from seconds to minutes for liquids. When, as in the present process, liquids are mixed, it is advantageous to promote the mixing operation additionally, for example by means of flow-induced crossmixing.

In the case of multilamination mixers or interdigital mixers, the substreams to be mixed are divided in a distributor into a large number of microflow threads and, at the exit of the distributor, then fed to the mixing zone alternately in lamellae. For liquids, mixing times in the range of seconds are achieved with the conventional multilamination mixers. Since this is insufficient for some applications (for example in the case of fast reactions), the basic principle has therefore been developed further by focusing the flow lamellae once again additionally by geometric or hydrodynamic means. The geometric focusing is achieved by a constriction in the mixing zone. The hydrodynamic focusing is achieved by two sidestreams which flow toward the main stream at right angles and thus further compress the flow lamellae. The focusing described allows lateral dimensions of the flow lamellae of a few micrometers to be achieved, such that even liquids can be mixed within a few 10s of ms.

The laminar diffusion mixers with convective crossmixing used may be micromixers with structured walls. In the case of micromixers with structured walls, secondary structures (grooves or projections) are disposed on the channel walls. They are preferably arranged at a particular angle to the main flow direction, for example at an angle of from about 30° up to 90°. In the case of inertia-dominated flow conditions, secondary vortices form as a result, which support the mixing process.

In a further suitable embodiment, the mixer with microstructure used is a split-recombine mixer. Split-recombine mixers are notable for stages composed of recurrent separation and combination of streams. Two regions of an unmixed fluid stream (it is usual to start from two equally large lamellae) are each conducted away from one another in one stage, distributed into two new regions in each case, and combined again. All four regions are arranged alongside one another in alternation such that the original geometry is re-established. In each of these stages, the number of lamellae is thus doubled stage by stage and lamellar thickness and diffusion pathway are thus halved. Examples of suitable split-recombine mixers are the caterpillar mixers from IMM and the caterpillar mixers from BTS-Ehrfeld.

Examples of suitable dynamic micromixers are, for example, micro-mixing pumps.

Preference is given to using static micromixers.

Examples of preferred static micromixers are especially the following laminar diffusion mixers:

"chaotic-laminar" mixers, for example T or Y pieces with a very small capillary diameter in the range from 100 μm to 1500 μm and preferably from 100 μm to 800 μm at the mixing point, and cyclone mixers;

multilamination mixers, for example the LH2 and LH25 slit plate mixers or larger types from Ehrfeld, and the interdigital mixers SIMM and Starlam® from IMM;

micromixers according to the multilamination principle with superimposed expanded flow, for example the SuperFocus Interdigital SFIMM microstructure mixer from IMM.

The inventive apparatuses I and II comprise, in a preferred embodiment, one or two reaction zones and especially one reaction zone.

In the context of the present invention, a reaction zone is, as already stated, understood to mean a section of a reactor in flow direction of liquid streams in which the polymerization proceeds. A reaction zone may be arranged within one part of a reactor, within an entire reactor or within two or more reactors. In a preferred embodiment, each reaction zone is disposed in a separate reactor.

In a specific embodiment, the inventive apparatus has at least one further feed for a liquid stream which is arranged in the course of a reaction zone or downstream of a reaction zone.

In a more specific embodiment, the inventive apparatus has at least one further feed for a liquid stream which comprises a termination reagent, which is arranged downstream of the (last) reaction zone.

In the inventive apparatus I, at least one reaction zone is microstructured. The reactor in which this reaction zone is disposed is consequently a reactor with a microstructured reaction zone. With regard to the definition of microstructured reaction zones, reference is made to the remarks below.

In apparatus II, the reactors used, in which the reaction zone(s) is/are arranged, may generally be all reactors customary for continuous polymerization. They are preferably temperature-controllable tubular reactors, tube bundle heat exchangers, plate heat exchangers or temperature-controllable tubular reactors with internals.

More preferably, however, at least one reactor with at least one microstructured reaction zone is also used for the polymerization in apparatus II.

The reactor with a microstructured reaction zone is also referred to here and hereinafter as a reactor with microstructures, microstructured reactor or microreactor.

Microstructured reactors are suitable for ensuring thermal homogeneity transverse to the flow direction and thus allow polymerization under substantially isothermal conditions. At the same time, each different volume element in principle has essentially the same temperature over the particular flow cross section. The maximum permissible temperature differences within a flow cross section depend on the desired product properties. The maximum temperature difference in one flow cross section is preferably less than 40° C., more preferably less than 20° C., even more preferably less than 10° C. and especially less than 5° C.

Conventional reactors and microreactors differ by their characteristic dimension and especially by the characteristic dimension of their reaction zones. In the context of the present invention, the characteristic dimension of a device, for example of a reactor, is understood to mean the smallest dimension at right angles to the flow direction. The characteristic dimension of the reaction zone of a microreactor is significantly less than that of a conventional reactor (for example by a factor of 10 or at least by a factor of 100 or even at least by a factor of 1000) and is typically in the range from a hundred nanometers to a few tens of millimeters. Compared to conventional reactors, microreactors therefore exhibit significantly different behaviour in relation to the heat and mass transfer processes which proceed. As a result of the greater ratio of surface area to reactor volume, for example, very good heat supply and removal is enabled, which is why it is also possible to carry out strongly endo- or exothermic reactions virtually isothermally.

In the context of the present invention, a microreactor is understood to mean one whose characteristic dimension is at most 30 mm. Accordingly, in the context of the present invention, the term "conventional reactor" refers to a reactor whose characteristic dimension is >30 mm.

In the context of the present invention, the characteristic dimension of the reaction zone of a reactor with microstructures is at most 30 mm, for example from 0.1 to 30 mm or preferably from 0.2 to 30 mm or more preferably from 0.4 to 30 mm; preferably at most 20 mm, for example from 0.1 to 20 mm or preferably from 0.2 to 20 mm or more preferably from 0.4 to 20 mm; more preferably at most 15 mm, for example from 0.1 to 15 mm or preferably from 0.2 to 15 mm or more preferably from 0.4 to 15 mm; even more preferably at most 10 mm, for example from 0.1 to 10 mm or preferably from 0.2 to 10 mm or more preferably from 0.4 to 10 mm; particularly preferably at most 8 mm, for example from 0.1 to 8 mm or preferably from 0.2 to 8 mm or more preferably from 0.4 to 8 mm; in particular at most 6 mm, for example from 0.1 to 6 mm or preferably from 0.2 to 6 mm or more preferably from 0.4 to 6 mm; especially at most 4 mm, for example from 0.1 to 4 mm or preferably from 0.2 to 4 mm and more preferably from 0.4 to 4 mm, and even more especially at most 3 mm, for example from 0.1 to 3 mm or preferably from 0.2 to 3 mm or more preferably from 0.4 to 3 mm.

The microreactors are preferably selected from temperature-controllable tubular reactors, tube bundle heat exchangers and plate heat exchangers. As characteristic dimensions, they preferably have tube or capillary diameters in the range from 0.1 mm to 25 mm, more preferably in the range from 0.5 mm to 6 mm, even more preferably in the range from 0.7 to 4 mm and especially in the range from 0.8 mm to 3 mm, and layer heights or channel widths in the range from preferably 0.2 mm to 10 mm, more preferably in the range from 0.2 mm to 6 mm and especially in the range from 0.2 mm to 4 mm. Tubular reactors with internals for use in accordance with the invention have tubular diameters in the range from 5 mm to 500 mm, preferably in the range from 8 mm to 200 mm and more preferably in the range from 10 mm to 100 mm. Alternatively, it is also possible in accordance with the invention to use flat channels comparable to plate apparatus with inlaid mixing structures. They have heights in the range from 0.5 mm to 20 mm, preferably from 1 to 10 mm, and widths in the range from 10 mm to 1000 mm and especially in the range from 10 mm to 500 mm. Optionally, the tubular reactors may comprise mixing elements permeated by temperature control channels (for example of the CSE-XR® type from Fluitec, Switzerland).

The optimal characteristic dimension arises here from the requirements on the permissible anisothermicity of the reaction, the maximum permissible pressure drop and the proneness of the reactor to become blocked.

Particularly preferred microreactors are:
tubular reactors composed of capillaries, capillary bundles with tube cross sections of from 0.1 to 25 mm, preferably from 0.5 to 6 mm, more preferably from 0.7 to 4 mm, with or without additional mixing internals, where a temperature control medium may flow around the tubes or capillaries;
tubular reactors in which the heat carrier is conducted within the capillaries/tubes, and the product whose temperature is to be controlled is conducted around the tubes and homogenized by internals (mixing elements), for example of the CSE-SX® type from Fluitec, Switzerland;
plate reactors which, like plate heat exchangers, are constructed with insulated parallel channels, networks of channels or areas which are equipped with or have no flow-breaking internals (posts), the plates conducting product and heat carrier in parallel or in a layer structure which has alternating heat carrier and product layers, such that chemical and thermal homogeneity can be ensured during the reaction; and
reactors with "flat" channel structures which have a "microdimension" only in terms of height and can be virtually as broad as desired, whose typical comb-shaped internals prevent the formation of a flow profile and lead to a narrow residence time distribution which is important for the defined reaction and residence time.

In a preferred embodiment of the invention, at least one reactor with plug flow characteristics is used, which has the delay characteristics of plug flow. When plug flow is present in a tubular reactor, the state of the reaction mixture (for example temperature, composition, etc.) can vary in flow direction, but the state of the reaction mixture is the same for each individual cross section at right angles to the flow direction. All volume elements entering the tube thus have the same residence time in the reactor. In figurative terms, the liquid flows through the tube as if it were an array of plugs sliding easily through the tube. In addition, the backmixing as a result of the intensified mass transfer at right angles to the flow direction can compensate for the concentration gradient at right angles to the flow direction. In spite of the usually laminar flow through apparatus with microstructures, backmixing can thus be prevented and a narrow residence time distribution can be achieved in a similar manner to that in an ideal flow tube.

The Bodenstein number is a dimensionless parameter and describes the ratio of the convection flow to the dispersion flow (for example M. Baerns, H. Hofmann, A. Renken, Chemische Reaktionstechnik [Chemical Reaction Technology], Lehrbuch der Technischen Chemie [Textbook of Industrial Chemistry], Volume 1, $2^{nd}$ edition, p. 332 ff). It thus characterizes the backmixing within a system.

$$Bo = \frac{uL}{D_{ax}}$$

where u is the flow rate $[ms^{-1}]$
L is the length of reactor [m]
$D_{ax}$ is the coefficient of axial dispersion $[m^2 h^{-1}]$ A Bodenstein number of zero corresponds to complete backmixing in an ideal continuous stirred tank. An infinitely large Bodenstein number, in contrast, means absolutely no backmixing, as in the case of continuous flow through an ideal flow tube.

In capillary reactors, the desired backmixing behavior can be established by adjusting the ratio of length to diameter as a function of the substance parameters and the flow state. The underlying calculation methods are known to those skilled in the art (for example M. Baerns, H. Hofmann, A. Renken: Chemische Reaktionstechnik, Lehrbuch der Technischen Chemie, Volume 1, $2^{nd}$ edition, p. 339 ff). If very low-backmixing behavior is to be achieved, the above-defined Bodenstein number is preferably selected to be greater than 10, more preferably greater than 20 and especially greater than 50. For a Bodenstein number of greater than 100, the capillary reactor then has substantially plug flow character.

Advantageous materials for the mixers and reactors for use in accordance with the invention have been found to be Hastelloy® types which are corrosion-resistant in the region of low temperatures, glass or ceramic for materials and/or corresponding coatings, for example $TiN_3$, Ni-PTFE, Ni-PFA or the like. Likewise suitable is PEEK (polyetheretherketone: high-temperature-resistant thermoplastic material). However, it is also possible to use austenitic stainless steels, such as 1.4541 or 1.4571, generally known as V4A and as V2A respectively, and stainless steels of US types SS316 and SS317Ti, for the mixers and reactors for use in accordance with the invention.

Owing to the high coefficients of heat transfer and owing to a high ratio of surface area to reaction volume, the heat transfer is selected such that temperature deviations in the reaction medium relative to the temperature of the temperature control medium of less than 40° C., preferably of less than 20° C., more preferably of less than 8° C. and especially of less than 5° C. occur. The reaction can thus proceed under substantially isothermal and hence defined and controlled conditions. In order to achieve this, according to the exothermicity and characteristic reaction time of the polymerization reaction, a ratio of heat exchange area to reaction volume of greater than 250 $m^2/m^3$, preferably greater than 500 $m^2/m^3$, more preferably greater than 1000 $m^2/m^3$ and especially greater than 2000 $m^2/m^3$ has to be selected.

In the at least one reaction zone, the product of coefficient of heat transfer and volume-specific heat transfer area is preferably greater than 12 500 $W/m^3K$, more preferably greater than 50 000 $W/m^3K$, even more preferably greater than 200 000 $W/m^3K$ and especially greater than 800 000 $W/m^3K$.

To determine the product of volume-specific heat transfer area and coefficient of heat transfer, the following relationship can be employed:

$$\alpha \cdot \left(\frac{A}{V}\right) = \frac{\Delta H \cdot \rho}{\Delta T \cdot \Delta t_R}$$

in which
- $\alpha$ is the coefficient of heat transfer [$W/m^2K$],
- $A/V$ is the volume-specific heat transfer area [$m^2/m^3$],
- $\Delta H$ is the reaction enthalpy [J/kg],
- $\Delta T$ is the maximum permissible temperature deviation in the reaction medium [K],
- $\rho$ is the partial density of the monomer in the reaction mixture [$kg/m^3$] and
- $\Delta t_R$ is the characteristic reaction time [s].

This gives rise to a product of coefficient of heat transfer and volume-specific heat transfer area for the reaction zone of preferably greater than 12 500 $W/m^3K$, more preferably greater than 50 000 $W/m^3K$, even more preferably greater than 200 000 $W/m^3K$ and especially greater than 800 000 $W/m^3K$.

The inventive apparatus is illustrated in detail hereinafter with reference to FIG. 1, without limiting it to this embodiment. In FIG. 1, the following reference numerals have been used:

1 Reservoir vessel
2 Optional filter
3 Mixer, optionally with microstructure
4 Reservoir vessel
5 Optional filter
6 Reservoir vessel
7 Optional filter
8 Mixer with microstructure
9 Reactor, temperature-controllable, optionally with microstructure
10 Optional mixer, temperature-controllable, optionally with microstructure
11 Discharge vessel, temperature-controllable The inventive apparatus comprises three reservoir vessels 1, 4 and 6, in which the starting materials are contained. The reservoir vessels 1 and 4 are each connected to a mixer 3 via a separate feed line equipped with customary metering and regulation devices and optional filters 2 and 4 respectively. The mixer 3 may optionally be configured as a mixer with microstructure. The mixer 3 is connected via a feed line to a mixer 8. The reservoir vessel 6 containing a third starting material is also connected to the mixer 8 via a feed line equipped with customary metering and regulation devices and an optional filter 7. The mixer 8 is configured as a mixer with microstructures. The dotted outline of mixers 3 and 8 indicates that these two mixers can also be combined in one mixing apparatus (3+8) which than imperatively is configured as a mixer with microstructures.

Downstream to the mixer 8, a reactor 9 is connected. The reactor 9 is temperature-controllable and can optionally be configured as a microstructured reactor. Optionally, a temperature-controllable mixer 10 can be connected downstream to the reactor 9. The mixer 10 may optionally be configured as a mixer with microstructures. On the output side, a discharge vessel 11 is connected downstream to the mixer 10 or the reactor 9, respectively. The discharge vessel 11 is optionally temperature-controllable and optionally equipped with a stirrer apparatus.

The process according to the invention can likewise be illustrated in detail with reference to FIG. 1, without limiting it to this embodiment. For this, the following reference numerals will be used in addition:
A Monomer-solvent mixture
B Initiator-electron donor-solvent mixture
C Catalyst-solvent mixture
D Reaction mixture
E Additives
F Product
G Final product.

A monomer-solvent mixture A is conducted from a reservoir vessel 1 with customary metering and regulation devices through an optional filter 2 into a mixer 3. The mixer 3 may optionally be configured as a mixer with microstructure. An initiator-electron donor-solvent mixture B is likewise fed into the mixer 3 from a reservoir vessel 4 by means of customary metering and regulation devices (for example pumps) and through an optional filter 5. In the mixer 3, the two liquid streams (A+B) are mixed at reaction temperature or an even lower temperature.

The mixture (A+B) obtained from the mixer 3 is fed into a mixer 8. A catalyst-solvent mixture C is likewise fed into the mixer 8 from a reservoir vessel 6 by means of customary metering and regulation devices and through an optional filter 7. The mixer 8 is configured as a mixer with microstructure. The two streams are mixed in the mixer 8 at reaction temperature or an even lower temperature to give the reaction mixture D.

The two mixing operations can alternatively also be carried out together in one mixing apparatus (3+8).

The mixers 3 and 8 or mixing apparatus (3+8) is followed downstream by a reactor 9 whose temperature can be controlled and which is operated at virtually constant temperature, i.e. substantially isothermally. This reactor 9 can, if appropriate, be configured as a microstructured reactor.

Optionally, a third temperature-controllable mixer 10 can be connected downstream of the reactor 9, in order, for example, to add additives E. The mixer 10 may, if appropriate, be configured as a mixer with microstructure.

Subsequently, the product F is passed into an optionally temperature-controllable discharge vessel 11 with optional stirrer apparatus. Here, it is possible to meter in further additives, etc. From discharge vessel 11, the final product G can be withdrawn.

The present invention further provides for the use of the inventive apparatus I or II for continuous preparation of a polymer by living cationic polymerization.

With regard to suitable and preferred features of the inventive apparatus and of living cationic polymerization, reference is made to the above remarks.

The invention is illustrated in detail by the non-limiting examples which follow.

EXAMPLES

Process example 1

Liquid isobutene was mixed continuously with a solution of hexane, phenyltriethoxysilane and trimethylpentane chloride in a micromixer and then mixed homogeneously with a solution of chlorobutane and $TiCl_4$ in a second micromixer at reaction temperature. The resulting reaction solution was subsequently pumped through a temperature-controlled reaction capillary with a defined uniform flow rate.

The experiment was carried out at different temperatures, residence times, diameters and lengths of the capillaries according to table 1. The reaction capillaries used were two capillaries of different length and with different internal diameters connected in series; the particular values are specified in table 1.

TABLE 1

| Ex. | Internal ∅ [mm][1] | Length [m][1] | Flow rate [g/h] | Initiator [% by wt.][2] | Catalyst [% by wt.][2] | Isobutene [% by wt.][2] | Cl-Bu/hexane [% by wt.][2,3] | $t^4$ [min] | T [°C.] |
|---|---|---|---|---|---|---|---|---|---|
| 1  | 0.8 + 4.0 | 30 + 33 | 270 | 1.7 | 2.4 | 27 | 51/17 | 73 | −40 |
| 2  | 0.8 + 4.0 | 30 + 6  | 336 | 1.7 | 2.5 | 23 | 54/18 | 12 | −70 |
| 3  | 0.8 + 4.0 | 30 + 6  | 336 | 1.8 | 1.5 | 23 | 55/18 | 12 | −40 |
| 4  | 0.8 + 4.0 | 30 + 33 | 336 | 1.7 | 0.7 | 27 | 53/17 | 73 | −70 |
| 5  | 0.8 + 4.0 | 30 + 33 | 336 | 1.8 | 2.5 | 23 | 54/18 | 73 | −40 |
| 6  | 0.8 + 4.0 | 30 + 33 | 336 | 3.1 | 2.0 | 23 | 55/17 | 57 | −40 |
| 7  | 0.8 + 4.0 | 30 + 6  | 336 | 1.8 | 1.5 | 23 | 55/18 | 12 | −55 |
| 8  | 0.8 + 4.0 | 30 + 33 | 336 | 1.7 | 0.7 | 27 | 53/17 | 73 | −55 |
| 9  | 0.8 + 4.0 | 30 + 33 | 336 | 1.7 | 2.5 | 23 | 54/18 | 57 | −55 |
| 10 | 0.8 + 4.0 | 30 + 33 | 336 | 1.7 | 2.4 | 27 | 51/17 | 57 | −55 |
| 11 | 0.8 + 4.0 | 30 + 33 | 336 | 1.7 | 2.4 | 27 | 51/17 | 57 | −55 |
| 12 | 0.8 + 4.0 | 30 + 33 | 336 | 1.7 | 2.4 | 27 | 51/17 | 57 | −55 |
| 13 | 0.8 + 4.0 | 30 + 33 | 269 | 1.7 | 2.0 | 27 | 52/17 | 73 | −25 |

[1] x + y means: in the first capillary, the internal diameter was x mm or the length was x m and, in the directly connected second capillary, the internal diameter was y mm or the length was y m.
[2] % by weight based on the total weight of the reaction solution (composed of isobutene, catalyst, initiator, electron donor and solvent)
[3] Cl-Bu = chlorobutane
[4] residence time in the reactor The polyisobutenes obtained in Examples 1 to 13 have the properties listed in Table 2.

TABLE 2

| Example | $M_n$ [g/mol] | PD[4] |
|---|---|---|
| 1  | 2719 | 1.29 |
| 2  | 3524 | 1.54 |
| 3  | 2016 | 1.22 |
| 4  | 3334 | 1.55 |
| 5  | 3262 | 1.23 |
| 6  | 1933 | 1.15 |
| 7  | 3126 | 1.26 |
| 8  | 3018 | 1.22 |
| 9  | 3447 | 1.38 |
| 10 | 3024 | 1.11 |
| 11 | 3061 | 1.15 |
| 12 | 2978 | 1.17 |
| 13 | 3274 | 1.20 |

[4] PD = $M_w/M_n$ (polydispersity)

The invention claimed is:

1. A process for continuously polymerizing cationically polymerizable monomers, the process comprising:
   (a) mixing at least two liquid streams, to obtain a reaction mixture comprising at least one cationically polymerizable monomer,
      wherein the at least two liquid streams each independently comprise one or more of the following components:
      at least one cationically polymerizable monomer;
      at least one initiator;
      at least one catalyst; and
      at least one electron donor,
         with the proviso that at least one of the at least two liquid streams comprises the cationically polymerizable monomer, wherein a stream comprising the at least one catalyst does not comprise any initiator or any electron donor,
wherein when the at least two liquid streams comprise more than two liquid streams the streams can be mixed successively or simultaneously, and
wherein at least one mixing operation occurs in a mixer having microstructures with a characteristic dimension from 10 to 1000 μm; and
(b) polymerizing the reaction mixture in at least one reaction zone.

2. The process according to claim 1, wherein the at least two liquid streams comprise:
(i-1) at least one monomer stream comprising the at least one cationically polymerizable monomer, optionally the at least one electron donor, and optionally at least one first solvent;
(ii-1) at least one initiator stream comprising the at least one initiator, optionally the at least one electron donor, and optionally at least one second solvent; and
(iii-1) at least one catalyst stream comprising the at least one catalyst and optionally at least one third solvent.

3. The process according to claim 2, wherein the at least two liquid streams comprise:
(i-1) at least one monomer stream comprising the at least one cationically polymerizable monomer and optionally the at least one first solvent;
(ii-1) at least one initiator stream comprising the at least one initiator, the at least one electron donor, and optionally the at least one second solvent; and
(iii-1) at least one catalyst stream comprising the at least one catalyst and optionally the at least one third solvent.

4. The process according to claim 1, wherein, the at least two liquid streams comprise:
(i-2) at least one catalyst stream comprising the at least one cationically polymerizable monomer, the at least one catalyst, and optionally at least one first solvent; and
(ii-2) at least one initiator stream comprising the at least one initiator, optionally the at least one electron donor, and optionally at least one second solvent.

5. The process according to claim 1, wherein the at least two liquid streams comprise:
(i-3) at least one catalyst stream comprising the at least one cationically polymerizable monomer, the at least one catalyst, and optionally at least one first solvent;
(ii-3) at least one initiator stream comprising the at least one initiator and optionally at least one second solvent; and
(iii-3) at least one electron donor stream comprising the at least one electron donor and optionally at least one third solvent.

6. The process according to claim 1, wherein the at least one cationically polymerizable monomer is selected from the group consisting of a linear alkene, an isoalkene, an alkadiene, a cycloalkene, a vinyl aromatic compound, a silyl-containing alkene and mixtures thereof.

7. The process according to claim 6, wherein the at least one cationically polymerizable monomer is selected from the group consisting of isobutene, a vinyl aromatic compound and mixtures thereof.

8. The process according to claim 7, wherein the at least one cationically polymerizable monomer is isobutene.

9. The process according to claim 1, wherein the at least one initiator comprises at least one functional group of formula (I):

wherein:
X is a halogen, a $C_1$-$C_6$-alkoxy group, or a $C_1$-$C_6$-acyloxy group;
$R^1$ is hydrogen or methyl; and
$R^2$ is methyl or forms a $C_5$-$C_6$-cycloalkyl ring with $R^1$ or with a molecular moiety to which the functional group is bonded, or $R^2$ may be hydrogen when the functional group is bonded to an aromatic or olefinically unsaturated carbon atom.

10. The process according to claim 9, wherein the at least one initiator is at least one compound represented by formulae I-A to I-F:

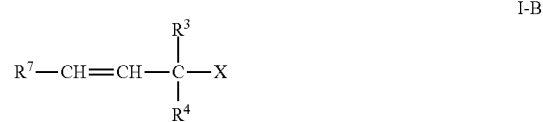

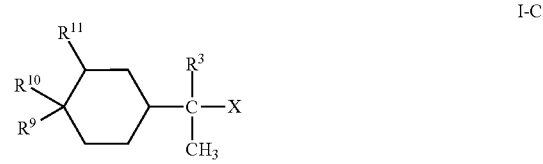

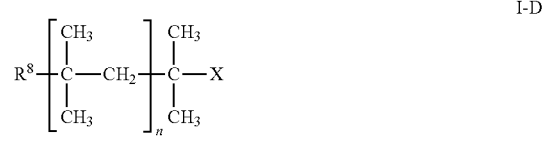

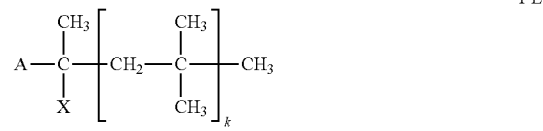

wherein:
X is a halogen, a $C_1$-$C_6$-alkoxy group, or a $C_1$-$C_6$-acyloxy group;
n and k are each independently 0, 1, 2, 3, 4 or 5;
m is 1, 2 or 3;
$R^3$, $R^4$ and $R^{10}$ are each independently hydrogen or methyl;
$R^5$, $R^6$ and $R^7$ are each independently hydrogen, a $C_1$-$C_4$-alkyl group or a $CR^3R^4$-X group; and
$R^8$ is hydrogen, methyl or an X group; and
$R^9$ and $R^{11}$ are each independently hydrogen or an X group; and A is an ethylenically unsaturated hydrocarbon radical having a vinyl group or a cycloalkenyl group.

11. The process according to claim 10, wherein:
the at least one initiator is a compound represented by the formula I-D;
$R^8$ is methyl;
X is halogen; and
n is 0 or 1.

12. The process according to claim 1, wherein the at least one catalyst is selected from the group consisting of titanium tetrachloride, boron trichloride, boron trifluoride, tin tetrachloride, zinc dichloride, vanadium pentachloride, iron trichloride, aluminum trichloride, alkylaluminum dichloride and dialkylaluminum chloride.

13. The process according to claim 12, wherein the at least one catalyst is titanium tetrachloride or boron trichloride.

14. The process according to claim 1, wherein the mixing (a) of the at least two liquid streams occurs at a temperature at or below a reaction temperature of the polymerizing (b).

15. The process according to claim 1, wherein the mixing (a) of the at least two liquid streams occurs in one stage in a mixer having microstructures.

16. The process according to claim 1, wherein the mixing (a) of the at least two liquid streams occurs in a plurality of stages, such that at least the last mixer situated in a flow direction before entry of the reaction mixture into the at least one reaction zone is a mixer having microstructures.

17. The process according to claim 16, wherein at least one stream comprising the at least one catalyst is the last component mixed.

18. The process according to claim 1, wherein the polymerizing (b) occurs in at least one microstructured reaction zone.

19. The process according to claim 1, wherein a product of a heat transfer coefficient and a volume-specific heat transfer area in the at least one reaction zone is greater than 12,500 $W/m^3K$.

20. The process according to claim 1, wherein, when the at least two liquid streams comprise more than two liquid streams, the streams are mixed successively.

21. The process according to claim 1, wherein, when the at least two liquid streams comprise more than two liquid streams, the streams are mixed simultaneously.

* * * * *